T. L. BURTON.
BRAKE RIGGING.
APPLICATION FILED JULY 25, 1913.
1,102,208.
Patented June 30, 1914.
3 SHEETS—SHEET 1.
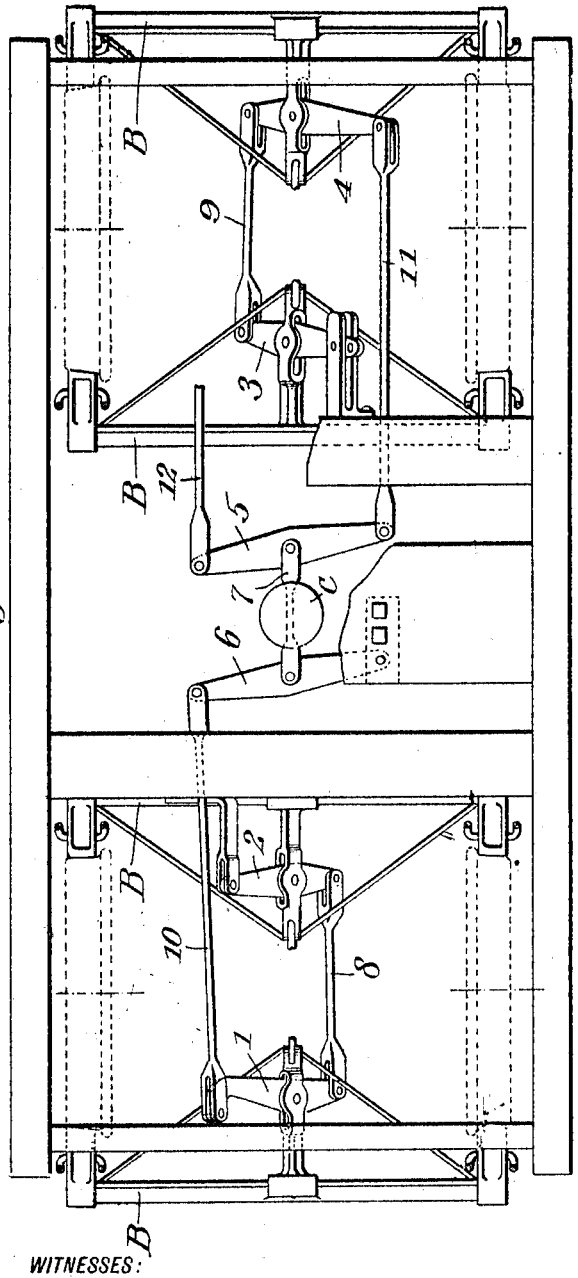
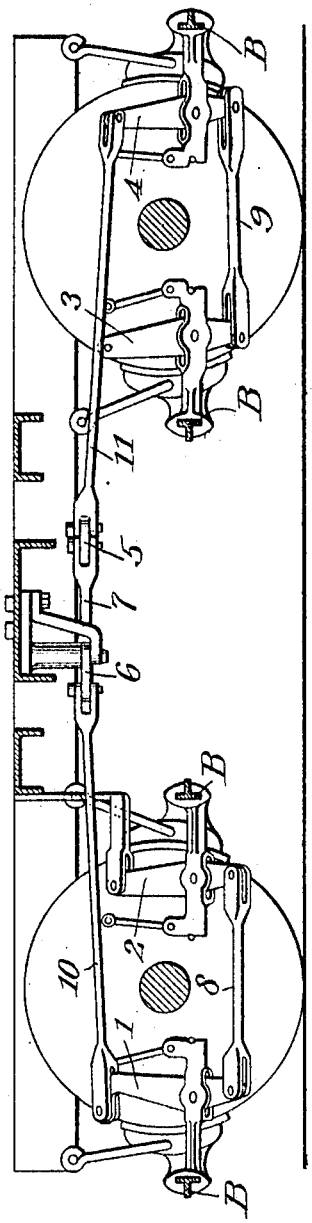
WITNESSES:
INVENTOR
Thomas L. Burton.
BY
Edward H. Wright
ATTORNEY

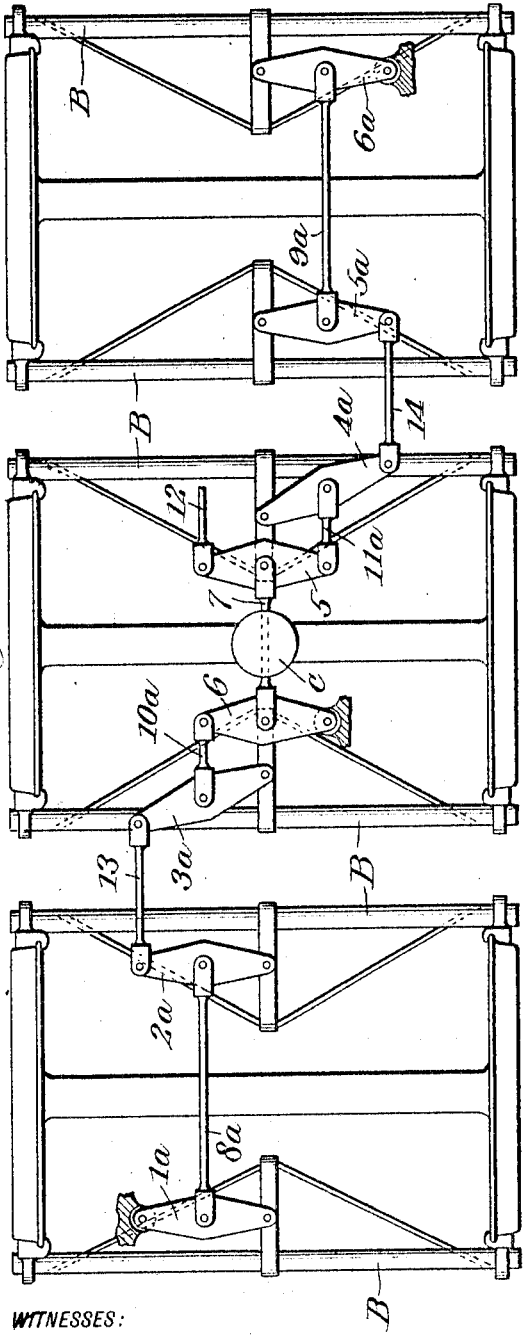
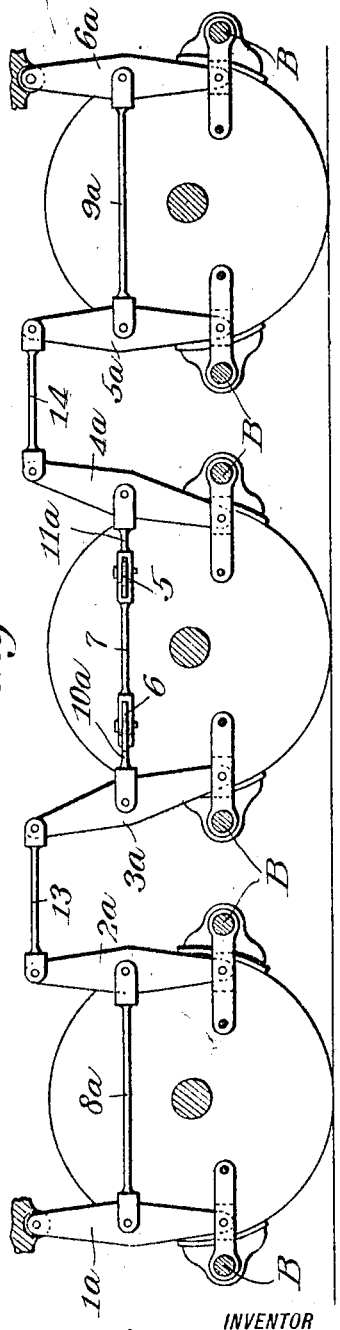

T. L. BURTON.
BRAKE RIGGING.
APPLICATION FILED JULY 25, 1913.

1,102,208.

Patented June 30, 1914.

3 SHEETS—SHEET 3.

WITNESSES:
H. Crocheron
A. B. Fowler

INVENTOR
Thomas L. Burton
BY
Edward Wright
ATTORNEY

UNITED STATES PATENT OFFICE.

THOMAS L. BURTON, OF PITTSBURGH, PENNSYLVANIA, ASSIGNOR, BY MESNE ASSIGNMENTS, TO THE AMERICAN BRAKE COMPANY, OF ST. LOUIS, MISSOURI, A CORPORATION OF MISSOURI.

BRAKE-RIGGING.

1,102,208.   Specification of Letters Patent.   Patented June 30, 1914.

Application filed July 25, 1913. Serial No. 781,083.

*To all whom it may concern:*

Be it known that I, THOMAS L. BURTON, a citizen of the United States, residing at Pittsburgh, in the county of Allegheny and State of Pennsylvania, have invented a certain new and useful Improvement in Brake-Rigging, of which improvement the following is a specification.

This invention relates to foundation brake rigging of what is known as the clasp type, in which brake shoes are applied to both sides of each pair of truck wheels, the object being to provide an improved design of this character in which the power from the brake cylinder is applied to an intermediate lever located toward the center of the truck, and having connections extending in opposite directions to the truck levers. In this way, the lines of pull are brought substantially through the center line of the truck, the stresses being more nearly symmetrical and applied with equalized pressure upon all brake shoes.

Figure 5:
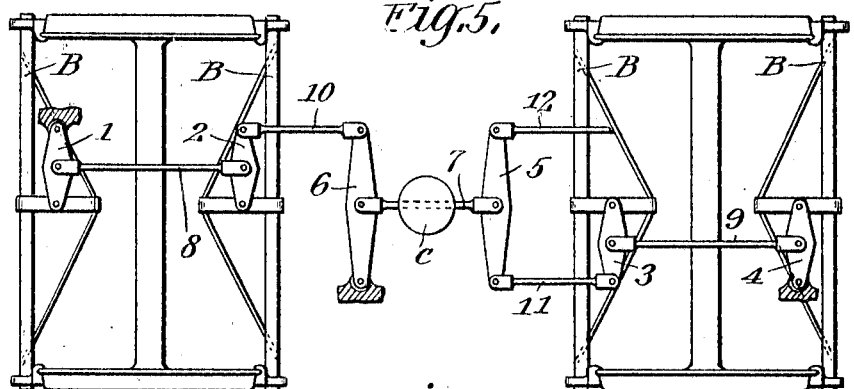
Figure 6:
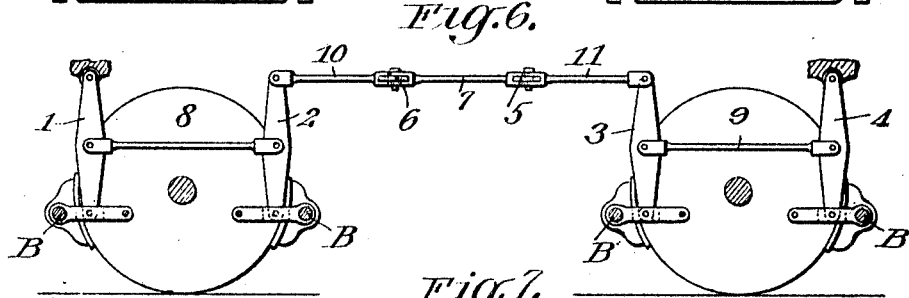

In the accompanying drawings: Figure 1 is a plan of one form of clasp type brake rigging, embodying my improvement, and applied to a four wheeled truck; Fig. 2, a longitudinal sectional view of the same, showing the levers in elevation; Fig. 3, a plan, showing my improvement applied in connection with a brake rigging for six wheeled trucks; Fig. 4, a longitudinal section of the same; Figs. 5 and 6, a plan and longitudinal section respectively, showing a slightly modified form of rigging for four wheeled trucks; and, Figs. 7 and 8, a plan and longitudinal section, respectively, showing a modification as applied to six wheeled trucks.

My improvement is particularly designed for use in connection with pivoted trucks having a plurality of pairs of wheels, usually four or six, as employed at both ends of a car, and having brake shoes applied to both sides of each pair of wheels. According to the construction shown in Figs. 1 and 2, the two pairs of truck wheels each have brake beams, B, applied to both sides, the truck levers, 1, 2, 3, and 4, being each pivoted at an intermediate point to one of said beams, and the lower ends of said pair of truck levers being coupled by the respective pull rods, 8 and 9. According to one of the features of my improvement, an intermediate floating lever, 5, is located at a point near or toward the center plate, C, or pivot point of the truck, and has connecting rods extending in opposite directions for operating the truck levers, the intermediate lever being actuated by a brake cylinder pull rod, 12, connected directly or indirectly to the piston rod of the brake cylinder, which is ordinarily located toward the center of the car, and at some distance from the truck.

As shown in Figs. 1 and 2, the intermediate floating lever, 5, has a pull rod, 11, connecting its end to the upper end of the truck lever, 4, at the far end of the truck in one direction, while a second intermediate lever, 6, with a fixed fulcrum at one end, is connected by pull rod, 10, with the upper end of the truck lever, 1, at the end of the truck in the opposite direction, the intermediate levers, 5, and 6, being coupled together at their middle points by the rod, 7. In this case, the truck levers, 2 and 3, constitute the so-called dead truck levers, having their upper ends each pivoted to a fixed fulcrum on the truck frame. The truck levers are usually inclined at an angle of about 45°, or some other angle, in order that the rods may conveniently clear the axles and members of the truck frame, and the levers are all so calculated and proportioned as to produce an equalized brake pressure upon all of the shoes. By means of this construction, the power from the brake cylinder pull rod, 12, is applied near the center of the truck, and is transmitted therefrom through the pull rod connections in opposite directions to the respective sets of truck levers. In this way, the swiveling movement of the truck does not materially affect the direction of application of the braking stresses which are substantially symmetrical with reference to the truck, and are applied with equal pressure to all brake shoes.

In the six wheeled truck brake rigging shown in Figs. 3 and 4, the truck levers, 1ª, 2ª, 3ª, 4ª, 5ª and 6ª, are pivoted at their lower ends to the brake beams, B, the levers of the outside pairs of wheels being coupled at their middle points by pull rods, 8ª and 9ª, respectively, while the upper ends of levers, 2ª and 3ª, are connected by rod, 13, and levers, 4ª and 5ª, by rod, 14. The intermediate floating lever, 5, in this case, has a connecting rod, 11ª, coupled to the middle point of truck lever, 4ª, in the direction toward one end of the truck, while the intermediate lever, 6, having the fixed fulcrum, is coupled by rod, 10ª, with the truck lever, 3ª, in the opposite direction, the intermediate levers being connected by the rod, 7, and actuated by brake cylinder pull rod, 12, the same as before described in connection with Fig. 1.

The construction shown in Figs. 5 and 6, is substantially the same as that of Figs. 1 and 2, except that the truck levers, 1, 2, 3, and 4, are pivoted at their lower ends to the brake beams, while the pull rods, 8 and 9, are connected at the middle points of the levers, instead of at their lower ends. In this arrangement also, the connecting rods, 10 and 11, from the intermediate levers are attached to the adjacent truck levers, 2 and 3 respectively. Otherwise the operation is the same, and will be readily understood.

Figure 7:
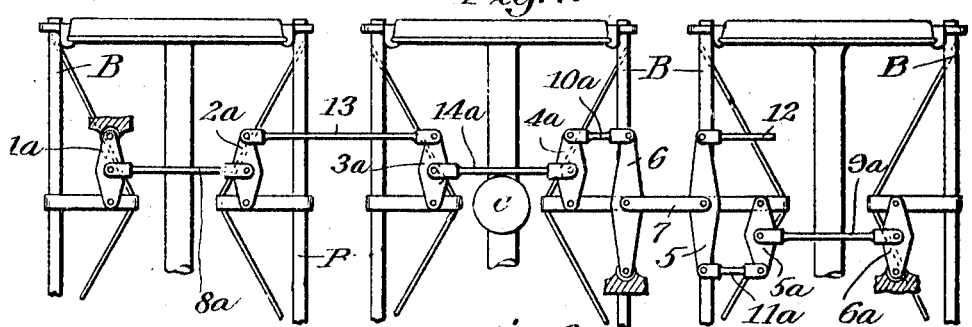
Figure 8:
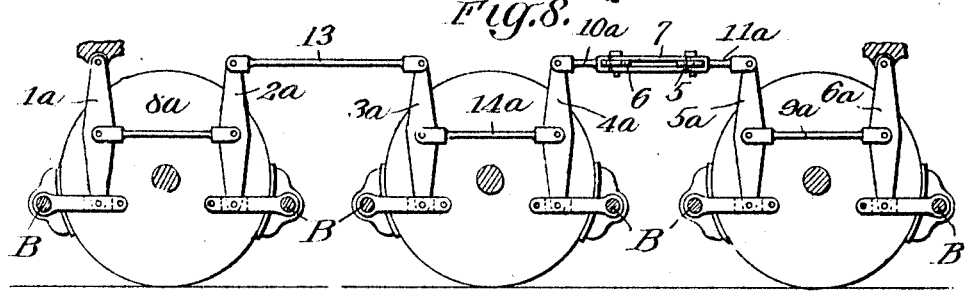

In Figs. 7 and 8, the construction is substantially the same as that shown in Figs. 3 and 4, except that the pair of intermediate levers with their connections is inserted between one of the truck levers of the center pair of wheels, and the adjacent truck lever of the end pair of wheels, instead of between the truck levers of the center pair of wheels. According to this arrangement, the rod, 11ª, connects the intermediate lever, 5, with the upper end of truck lever, 5ª, and rod, 10ª, connects intermediate lever, 6, with truck lever, 4ª, while the truck levers, 3ª and 4ª, of the center pair of wheels are coupled by rod, 14ª. In this case, the intermediate lever is not located quite as near the center of the truck as it is in the other designs, but the operation and the advantageous results are substantially the same, as will be readily understood.

Having now described my invention, what I claim as new and desire to secure by Letters Patent, is:

1. In a brake rigging for pivoted trucks having a plurality of pairs of wheels, the combination with brake shoes applied to both sides of each pair of wheels, and truck levers for the same, of an intermediate floating lever and an intermediate lever with a fixed fulcrum located near the center of said truck, and having connecting members extending in opposite directions therefrom to actuate said truck levers with equalized pressure upon the brake shoes, and a brake cylinder pull rod for actuating one of said intermediate levers.

2. In a brake rigging for pivoted trucks having a plurality of pairs of wheels, the combination with brake shoes applied to both sides of each pair of wheels, and truck levers for the same, of an intermediate floating lever located near the center of said truck, and having a pull rod connected to one of said truck levers, pull rods connecting the truck levers of each pair of wheels, and another intermediate lever having a fixed fulcrum and coupled to the first intermediate lever and to another truck lever.

3. In a brake rigging for pivoted trucks having a plurality of pairs of wheels, the combination with brake shoes applied to both sides of each pair of wheels, and truck levers for the same, of an intermediate floating lever located near the center of said truck, and having a connecting member for actuating the truck levers toward one end of the truck, another intermediate lever coupled to the first lever and having a fixed fulcrum, a connecting member for actuating the truck levers toward the other end of the truck, and a brake cylinder pull rod attached to the first intermediate lever.

4. In a brake rigging for pivoted trucks having a plurality of pairs of wheels, the combination with brake beams and shoes applied to both sides of each pair of wheels, truck levers pivoted to said brake beams, and pull rods for said truck levers, of a floating intermediate lever located near the center of said truck and having a pull rod connection with the adjacent truck lever, another intermediate lever with a fixed fulcrum also located near the center of said truck and having a pull rod connection with its adjacent truck lever, a rod coupling said intermediate levers together, and a brake cylinder pull rod attached to the floating intermediate lever.

5. In a brake rigging for trucks having a plurality of pairs of wheels, the combination with brake beams and shoes applied to both sides of each pair of wheels, truck levers pivoted at their lower ends to said beams, and pull rods connecting said truck levers, of intermediate levers near the center of the truck, one being a floating lever, and the other having a fixed fulcrum and each having a pull rod connection with one of the truck levers, a rod coupling said intermediate levers together, and a brake cylinder pull rod attached to one of said intermediate levers.

6. In a brake rigging for six wheeled trucks, the combination with brake beams and shoes applied to both sides of each pair of wheels, truck levers pivoted to said beams, of a floating intermediate lever near the center of said truck and having a pull rod connection with one of the truck levers of the center pair of wheels, another intermediate lever having a connection with the first intermediate lever and with the other truck lever of said center pair of wheels, and a brake cylinder pull rod attached to the first intermediate lever.

In testimony whereof I have hereunto set my hand.

THOMAS L. BURTON.

Witnesses:
J. SNOWDEN BELL,
EDWARD A. WRIGHT.